United States Patent [19]

Johnson, Jr.

[11] Patent Number: 5,017,856
[45] Date of Patent: May 21, 1991

[54] BATTERY CHARGING SYSTEM

[75] Inventor: Robert M. Johnson, Jr., Lake Zurich, Ill.

[73] Assignee: Motorola, Inc., Schaumburg, Ill.

[21] Appl. No.: 374,373

[22] Filed: Jun. 30, 1989

[51] Int. Cl.⁵ .................... H01M 14/00; H02J 7/00
[52] U.S. Cl. ................................ 320/2; 320/4; 429/7
[58] Field of Search ............... 320/2, 13, 40; 429/1, 429/7

[56] References Cited

U.S. PATENT DOCUMENTS

| | | | |
|---|---|---|---|
| 3,959,707 | 5/1976 | Stephens | 320/39 |
| 4,006,396 | 2/1977 | Bogut | 320/2 |
| 4,011,366 | 3/1977 | Bones et al. | 429/7 X |
| 4,035,552 | 7/1977 | Epstein | 429/7 X |
| 4,045,720 | 8/1977 | Alexandres | 320/2 X |
| 4,315,364 | 2/1982 | Leffingwell | 320/2 X |
| 4,407,909 | 10/1983 | Goebel | 429/7 X |
| 4,424,476 | 1/1984 | Mullersman | 320/36 |
| 4,609,860 | 9/1986 | Fasen | 320/14 |
| 4,686,443 | 8/1987 | Steblay | 320/23 |
| 4,686,444 | 8/1987 | Park | 320/31 |
| 4,691,157 | 9/1987 | McDermott | 320/2 |
| 4,727,306 | 2/1988 | Misak et al. | 320/35 |
| 4,742,290 | 5/1988 | Sutphin et al. | 320/21 |
| 4,871,956 | 10/1989 | Barrella | 320/13 |
| 4,910,103 | 3/1990 | Yoshikawa et al. | 429/7 X |

OTHER PUBLICATIONS

Moli Energy Ltd., "Parallel String Imbalance Circuitry", Feb. 1988.
Moli Energy Ltd., "Molikit Instruction Manual", PS#31027, 1987, pp. 45-46.
Gordon Wayne James, "Improved Safety Battery for Use in Portable Radio", Motorola Technical Developments, vol. 6, Oct. 1986, pp. 36-37.

Primary Examiner—R. J. Hickey
Attorney, Agent, or Firm—Raymond A. Jenski; Rolland R. Hackbart

[57] ABSTRACT

A battery charging system including a battery of one chemistry type and a battery charger for a different battery type is disclosed. If a battery over-discharge condition or if an electrochemical cell imbalance is detected within the battery, the battery prevents charging by the battery charger by means of a resettable switch.

19 Claims, 1 Drawing Sheet

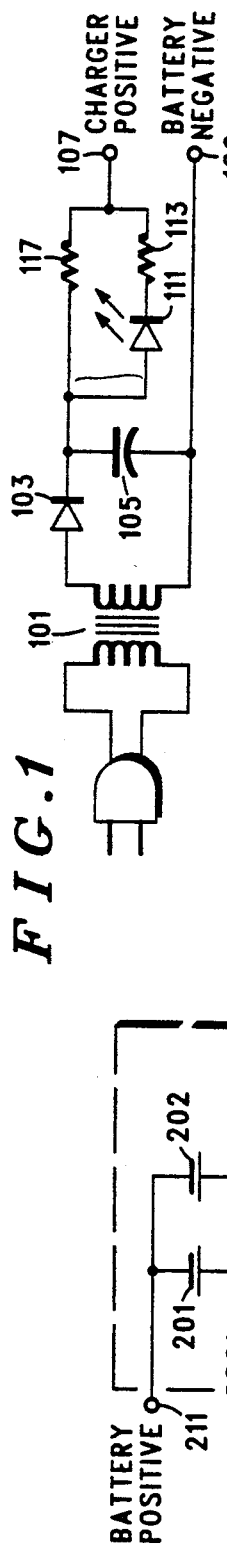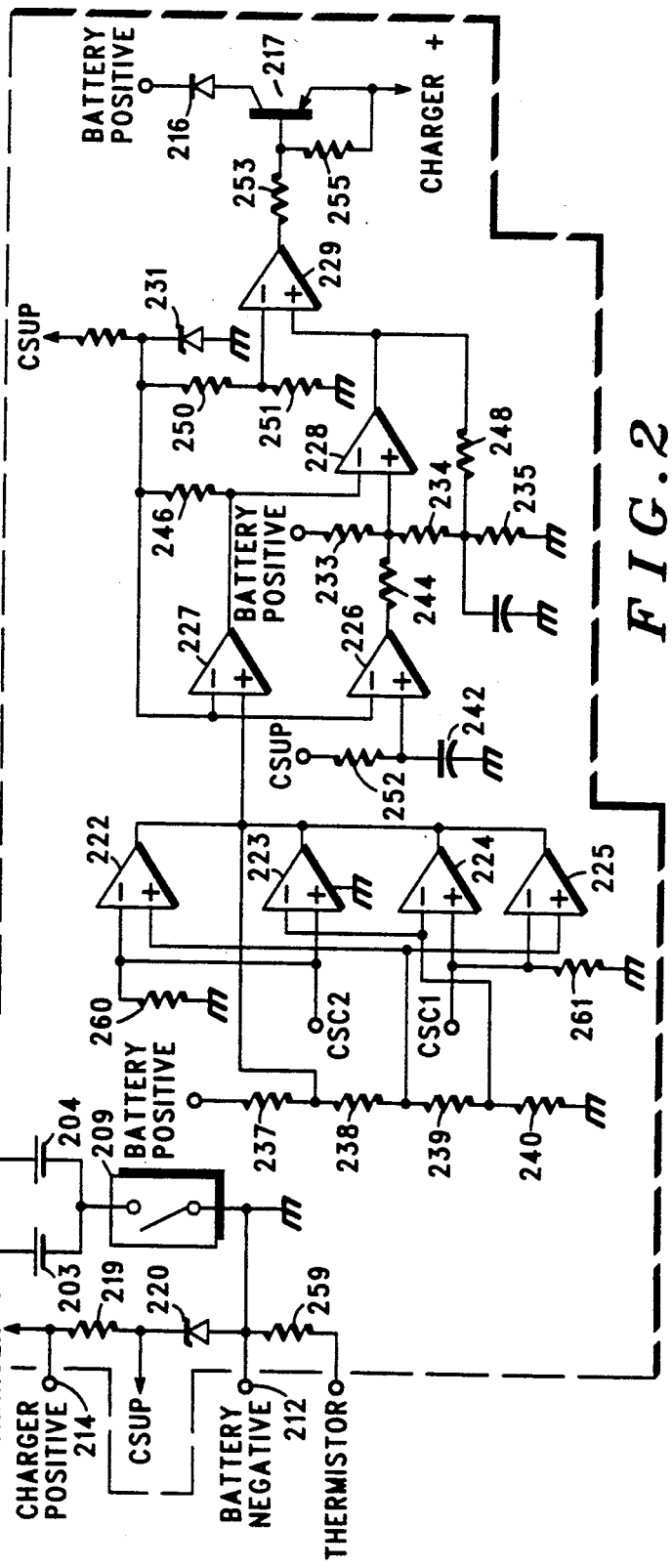
FIG.1
FIG.2

BATTERY CHARGING SYSTEM

BACKGROUND OF THE INVENTION

This invention relates generally to a system of charging rechargeable batteries and more particularly to a battery charging system for a lithium electrode rechargeable battery which may be incompatible with earlier battery chargers.

Battery chargers usually contain all the circuitry needed to charge a battery except for sensing devices such as thermistors. Batteries typically contain no electrical circuitry except for sensing devices such as thermistors or type determining circuitry such as that described in U.S. patent application Ser. No. 341,778, "Method and Apparatus for Determining Battery Type", filed on behalf of Johnson et al. on 04/21/89. However, it has been noted that some designers have placed some active circuitry within the battery housing primarily to protect the electrochemical cells from damage due to accidental short circuits during transport or use.

Rechargeable batteries employing a lithium electrode generally provide a greater energy storage capacity per unit volume than other commercially available batteries used in portable products. A lithium battery is a desirable addition to such a portable product. Lithium batteries, however, have charging characteristics which are different than other types of rechargeable batteries.

When a new battery type becomes available, full compatibility between currently available battery chargers and the new battery type is usually not present; the new battery type connot be optimally charged by the chargers optimized for previously existing battery types.

Other charging systems exist using batteries which contain additional circuitry within the battery housing to accomplish temperature sensing of the electrochemical cells, which is coupled to the charger circuitry for modification of the charger performance. Any additional current drain placed on the battery by this circuitry causes reduced storage life for the battery. In order to reduce this additional current drain, expensive low power circuit elements have been used.

SUMMARY OF THE INVENTION

Therefore, the present invention solves the problem of battery and charger incompatibility by providing circuitry for regulating charging within the battery itself and has the circuitry active only when the battery is in the charger and deriving its power from the charger.

Accordingly, it is one object of the present invention to detect an over-discharge condition and prevent the battery from being charged when it has been over-discharged.

It is another object of the present invention to detect electrochemical cell imbalance within the battery and prevent the battery from being charged when there is an imbalance.

It is a further object of the present invention to reset the battery charge prevention if the battery electrochemical cell or cells are healed..

BRIEF DESCRIPTION OF THE DRAWINGS

FIG. 1 is a schematic diagram of a conventional battery charger.

FIG. 2 is a schematic diagram of the battery and associated circuitry in accordance with the present invention.

DETAILED DESCRIPTION OF THE PREFERRED EMBODIMENT

The invention disclosed herein is of a battery charging system. It can be used on different types of batteries but in the preferred embodiment it is for use with lithium batteries and provides backwards compatibility with existing battery chargers designed for nickel-cadmium or other types of rechargeable batteries. It is anticipated that batteries employing the present invention will be used for portable radiotelephone equipment such as cellular portable radiotelephone model number F09HGD8453AA available from Motorola, Inc.

FIG. 1 is a schematic of a conventional battery charger having the capability of charging conventional batteries. A more complicated battery charger such as that described in U.S. patent application Ser. No. 361,534, "Multiple Battery Multiple Rate Battery Charger", filed on behalf of Johnson et al. on 06/05/89 may also be used. In FIG. 1, a transformer 101 may be a direct plug-in wall mount transformer unit provides an AC output to supply power to the charger. This AC output causes rectifier diode 103 to conduct on half of the AC cycle. When diode 103 conducts, the capacitor 105 charges. The energy stored in capacitor 105 allows for charging during the half of the AC cycle when the diode 103 is not conducting. The charging current is determined by the effective resistance between capacitor 105 and the charging terminals 107 and 109. When a battery is present in the charger and current begins to flow into the charger positive terminal 107 through the LED (light emitting diode) indicator 111 and resistor 113. Additional charging current is supplied through resistor 117.

The charger circuitry of FIG. 1 is merely a source of charging current and will continue to source current to any battery coupled to it. A battery having the circuitry shown in the schematic of FIG. 2 provides a built-in intelligence to protect and properly charge a battery which is particular about the type of charge it receives. This intelligence includes: (1) Voltage Cutoff: in which the charging of the battery will be terminated when the battery voltage exceeds a threshold. In the preferred embodiment, this threshold is 7.2 volts. (2) Hysteresis: Once the charging is terminated, the voltage at the terminals of the electrochemical cells will drop and unless there is hysteresis the charger will oscillate in and out of charge. The hysteresis of the preferred embodiment will disallow charge until the battery positive voltage is reduced to approximately 6.2 volts. (3) Contact Debounce: If the battery were to see intermittent contact with the charger terminals, charger + power may be removed for a moment and the hysteresis may be reset. Using a charged up capacitor, contact bounces of at least one second in duration will not reset hysteresis. (4) Over-discharge charge disable: With lithium batteries, if the cells are over-discharged or if they are damaged, repeated charging may cause a possible safety problem. Charge is denied when the battery is over-discharged In the preferred embodiment this condition is established when the battery voltage is 3.5 volts or less. (5) Cell string imbalance charge disable: When near the end of the life of a cell the cell's voltage becomes substantially reduced with respect to the other cells in the battery; the battery develops a potential safety problem. Charge is disabled to avoid abuse when the defective cell voltage is less than 40% of the total cell string voltage.

FIG. 2 is an electrical schematic of the circuitry disposed within a battery housing 200, shown in broken line in the schematic. The lithium electrochemical cells 201, 202, 203, and 204 of the preferred embodiment are assembled in a series-parallel combination of two cell strings. At the center of each cell string is a thermal fuse 206, 207 which is thermally coupled to its associated series-connected cells to provide protection for the cells 201-204. If the cells 201-204 reach a temperature greater than the trip point of the thermal fuses (206 or 207) will open and the cells will be disconnected from use. The two cell strings are run through a current-activated circuit breaker 209, commonly known as a "polyswitch" available from Raychem, Inc., which will trigger under short circuit conditions across the BATTERY POSITIVE terminal 211 and the BATTERY NEGATIVE terminal 212 on the outside of the battery housing 200. The center points of each series-parallel cell string are denoted by CSC1 or CSC2.

The CHARGER POSITIVE terminal 214, which appears on the outer surface of the battery housing 200 is internally connected to and denoted by Charger +. When the battery is being charged from a battery charger circuit like that if FIG. 1, the charge current is passed to the electrochemical cells 201-204 through a diode 216 and a transistor switch 217. The charge current is also connected to a resistor 219 and to charger supply line CSUP which supplies power to operate the internal circuitry from the charger rather than from the electrochemical cells 201-204. A Zener diode 220 is used to protect the circuitry from voltages in excess of the electrical parts ratings.

When the battery is not present in a charger, there is no power supplied to Charger +. In this condition, all the comparators 222, 223, 224, 225, 226, 227, 228, and 229 (which may be comparator type number LM2901D available from Motorola, Inc. having PNP input junctions) do not have a power supply and are essentially in an off state because, lacking a power supply input, they essentially draw no current. Similarly, the conventional voltage reference 231 (which in the preferred embodiment is a 2.5 volt reference) also draws no current. Therefore all the active circuitry draws no current when the battery is not in the charger. However, there are two resistor dividers which draw a small amount of current from the electrochemical cells. First is the series connection of resistors 233, 234, and 235. This resistor divider uses high value resistors to minimize the current drain from the battery. The other resistor divider is that formed by resistors 237, 238, 239, and 240, which also minimizes the amount of current by using high value resistors. Because the active devices do not draw any current from the electrochemical cells and the comparator inputs are PNP junction inputs, the present invention minimizes the amount of power that is drained from the battery when the battery is not being charged. This feature gives the battery greater storage life. In the case of a battery employing a lithium electrode in the electrochemical cells, the additional circuitry of the present invention does not degrade the shelf life substantially.

The circuitry within the battery housing 200 is used when the battery is placed into the charger, the capacitor 242 is at zero volts relative to common, initially holding the positive input terminal of comparator 226 low relative to the inverting input which is connected to the voltage reference from reference 231. This initial condition gives a "low" output signal. Because the output is low, the signal provided via series resistor 244 and shunt resistors 234 and 235 drives the non-inverting input of comparator 228 low. The inverting input terminal of comparator 228 is connected to the voltage reference 231 through resistor 246. The resistor 244 is chosen so that the voltage at the non-inverting input of comparator 228 will be below the voltage of voltage reference 231. This creates a "false" condition wherein the output of the comparator 228 goes low. When the output of comparator 228 is low, the resistor 248 is essentially placed in parallel across resistor 235 further reducing the voltage at the non-inverting input of comparator 228.

Since the battery has been placed in the charger, the initial (non-charged) condition across capacitor 242 will change. Capacitor 242 charges with a time constant determined by its capacity and resistor 252. When the voltage across capacitor 242 exceeds the value of the voltage from voltage reference 231, the output of comparator 226 becomes an open circuit. This open circuit essentially removes resistor 244 from the circuit so that the voltage at the non-inverting input of comparator 228 increases. This sequence of events sets the resistor divider of resistors 233, 234, and 235, in parallel with resistor 248. When the voltage at the terminals of the electrochemical cells 201-204 is such that the voltage at the non-inverting input of comparator 228 exceeds the reference voltage supplied by voltage reference 231, the electrochemical cells of the battery are deemed to be fully charged.

In the preferred embodiment employing lithium electrode cells, this happens when the battery has an output voltage across terminals 211 and 212 of approximately 7.2 volts. When the battery charges above 7.2 volts the input at the positive terminal comparator 228 is greater than the reference voltage, the output becomes an open circuit, and resistor 248 essentially is isolated from the resistor divider of resistors 233, 234, and 235. Thus, the voltage at the positive terminal of comparator 228 increases. This provides a hysteresis effect so that once the circuit switches and the battery stops being charged, the circuit does not oscillate back and forth as the battery voltage settles.

When the output of comparator 228 becomes an open circuit, the voltage at the non-inverting input of comparator 229 is essentially the divided down voltage present at the node between resistors 234 and 235. This voltage is compared against the divided down reference voltage from reference 231 (by resistors 250 and 251 with the common point between them driving the inverting input of comparator 229). When the output voltage of comparator 228 (the voltage at comparator 229 non-inverting input) is greater than the voltage at the inverting input of comparator 229, a "true" condition is created and comparator 229 output becomes an open circuit. When the output of comparator 228 is low, the non-inverting input of comparator 229 is low and the output of comparator 229 is low. When the outputs of these comparators are low, they will sink current. Thus, when the output of comparator 229 is low, current will be drawn from the base of the transistor 217 through resistor 253, thereby turning transistor 217 on. When it is on, current will flow from the Charger ×line through the transistor 217, through diode 216, and into the electrochemical cells 201-204 to charge them. When the output of comparator 229 is open, there will not be base current flowing through resistor 253 and transistor 217 will be off and the electrochemical cells will not charge. Resistor 255 provides pull-up for the base of transistor 217 when the output of comparator 229 is open to insure that the transistor 217 is off. The diode 216 prevents the electrochemical cells from draining back through the transistor 217 when the battery is not in a charger.

Zener diode 220 is coupled in series with resistor 219 to create the supply line of CSUP. CSUP is limited to the Zener voltage so CSUP to the comparators will not exceed their maximum ratings.

In accordance with one feature of the present invention, the battery may automatically be prevented from accepting charging current if the voltage available from the electrochemical cells is below a threshold voltage. This low voltage threshold (determined by the chemistry of the lithium system in the preferred embodiment) can be reached if the battery is over-discharged. At this voltage, the electrochemical cells have most likely been damaged and the safety of the battery may be compromised. To accomplish an automatic removal of the electrochemical cells, a voltage detection circuit is employed in the preferred embodiment. Comparator 227 is used to disable the charging of an over-discharged battery. This is accomplished by using the voltage from voltage reference 231 driving the inverting input of comparator 227 and a divided-down voltage derived from the resistor network of resistors 237, 238, 239, and 240 and voltage coupled from the BATTERY POSITIVE terminal 211. The node between resistor 237 and resistor 238 is coupled to the non-inverting input of comparator 227 such that when, in the preferred embodiment, the battery voltage goes below approximately 3.5 volts, the output of comparator 227 goes low. Upon this occurrence the reference voltage is effectively removed from the inverting input of comparator 228. The battery voltage divided down by resistors 233, 234, and 235 provides a voltage greater than the low voltage present at the inverting input of comparator 228. This causes the output of comparator 228 to become an open circuit, turning off comparator 229, turning off the transistor 217 and stopping charge from going into the electrochemical cells.

A further protection available in the charging system of the present invention is that of electrochemical cell imbalance. If one of the four electrochemical cells has been damaged or if the electrochemical cell has reached its end of life before the other cells, its voltage will be less than that of the other cells. If the voltage is less than that applied to the opposite input of either comparator 222 or comparator 225 coupled to the electrochemical cells, or if the voltage is greater than that applied to the opposite input of either comparator 223 or comparator 224 coupled to the electrochemical cells, one of the outputs of the associated comparators will go low. By going low the comparator output changes the resistor divider consisting of resistors 237, 238, 239, and 240 so that the divider has been disabled and the voltage at the node between resistors 237 and 238 approaches ground potential. By going to ground, the voltage at the node latches the output of comparator 227 to ground potential.

For either protection mode, low battery voltage or cell imbalance, if the defective cells later corrects itself, the circuit will not be reset and charging will not recommence unless the battery is removed from the charger. This low voltage state at the nodes of CSC1 and CSC2 is detected and the outputs of comparators 222, 223, 224, and 225 are logic OR-ed, to drive the non-inverting input of comparator 227 low. The comparison to the reference voltage at the inverting input of comparator 227 creates a "false" condition and prevents charging of the electrochemical cells. As a failsafe, resistors 260 and 261 are present so that if the connections to the center of both the cell strings become broken, these resistors will pull down the voltages to ground or near ground potential and creates a "false" condition as though one of the cells was below voltage. However, the removal of the battery from the charger removes the supply from CSUP and allows the circuit to relax. If a defective cell corrects itself, the battery can again be recharged.

To reduce contact bounce, the voltage at the positive input of comparator 228 does not go away because it is coupled to the electrochemical cells through resistors 233, 234, and 235. When the reference voltage disappears the inverting input of comparator 228 goes low to create a "true" condition (the output of comparator 228 becomes an open circuit). Thus, if the battery were being charged prior to a contact bounce caused by, for example a brief extraction and reinsertion of the battery into a charger, the circuit would allow the battery to continue to be charged after the contact bounce. This protection lasts long enough for capacitor 242 to discharge below the reference voltage obtained from reference 231.

To maintain compatibility with battery chargers which use a thermistor to establish an end of charge condition such as a nickel cadmium electrochemical cell battery, a fixed value resistor 259 is connected to ground. In the preferred embodiment, the resistor value is chosen such that the lithium electrochemical cells of the present invention cannot be fast charged. The battery charger having fast and slow charge modes thus is constrained to the slow rate of charge. This rate is the desired rate for the lithium battery of the present invention.

Thus a rechargeable battery system for batteries of a type having charge characteristics which may be incompatible with previously made battery chargers has been shown and described. The circuitry which makes the battery compatible draws little current from the electrochemical cells, relying mainly upon power from the charger for operation. If a battery over-discharge condition is detected as a battery voltage below a predetermined voltage threshold or if a battery electrochemical cell imbalance is detected as a difference in one cell voltage relative to another, charging of the battery is prevented by a resettable semiconductor switch.

I claim:

1. A battery assembly including a housing enclosing at least one electrochemical cell and having protection from unsuitable charging from a battery charger providing a charging current, the protection disposed within the housing of the battery assembly comprising:
   means, disposed within the battery housing, for determining when the voltage of the at least one electrochemical cell is less than a predetermined voltage; and
   means, disposed within the battery housing and responsive to said means for determining, for resettably interrupting the charging current.

2. A battery assembly in accordance with claim 1 further comprising means, disposed within the battery housing, for detecting when a first electrochemical cell of the battery assembly produces a voltage which is a predetermined amount smaller than a voltage produced by a second electrochemical cell of the battery assembly.

3. A battery assembly in accordance with claim 2 wherein said means for resettably interrupting the charging current further comprises means responsive to said means for detecting.

4. A battery assembly charging system comprising:
means for supplying direct current (DC) electrical energy to a battery assembly;
a battery assembly comprising:
(a) a housing,
(b) a plurality of electrochemical cells disposed within said housing,
(c) means, disposed within said housing and coupled to said means for supplying DC electrical energy, for producing a reference voltage,
(d) means, disposed within said housing, for determining when said electrochemical cells produce a terminal voltage exceeding a predetermined proportion of said reference voltage,
(e) means, disposed within said housing, for detecting when a first electrochemical cell produces a voltage which is a predetermined amount smaller than a voltage produced by a second electrochemical cell, and
(f) means, disposed within said housing and responsive to at least one of said means for determining and said means for detecting, for resettably interrupting said DC electrical energy supply to said plurality of electrochemical cells.

5. A battery assembly charging system in accordance with claim 4 wherein said plurality of electrochemical cells further comprises at least two electrochemical cells in a series circuit arrangement.

6. A battery assembly charging system in accordance with claim 5 wherein said means for determining further comprises a comparator coupled to a voltage divider which is coupled to said series circuit arrangement of said electrochemical cells.

7. A battery assembly charging system in accordance with claim 4 wherein said means for producing a reference voltage further comprises a zener diode.

8. A battery assembly employing a predetermined chemistry system and capable of being recharged with a recharging current from a battery charger adapted to charge batteries assembly employing a chemistry system of a type different than the predetermined chemistry system, comprising:
a housing;
a plurality of electrochemical cells disposed within said housing;
means, disposed within said housing, for producing a reference voltage;
means, disposed within said housing, for determining when said electrochemical cells produce a terminal voltage exceeding a predetermined proportion of said reference voltage; and
means, disposed within said housing and responsive to said means for determining, for interrupting the recharging current to said plurality of electrochemical cells.

9. A battery assembly in accordance with claim 8 further comprising means, disposed within said housing, for detecting when a first electrochemical cell produces a voltage which is a predetermined amount smaller than a voltage produced by a second electrochemical cell.

10. A battery assembly accordance with claim 8 wherein said plurality of electrochemical cells further comprises at least two electrochemical cells in a series circuit arrangement.

11. A battery assembly in accordance with claim 10 wherein said means for determining further comprises a comparator coupled to a voltage divider which is coupled to said series circuit arrangement of said electrochemical cells.

12. A battery assembly in accordance with claim 8 wherein said means for producing a reference voltage further comprises a zener diode.

13. A battery assembly in accordance with claim 8 wherein the predetermined chemistry system further comprises a lithium electrode.

14. A battery assembly in accordance with claim 8 wherein said means for interrupting further comprises resettable means for interrupting the recharging current.

15. A battery assembly employing a predetermined chemistry system and capable of being recharged with a recharging current from a battery charger adapted to charge batteries assembly employing a chemistry system of a type different than the predetermined chemistry system, comprising:
a housing;
a plurality of electrochemical cells disposed within said housing;
means, disposed within said housing, for detecting when a first electrochemical cell produces a voltage which is a predetermined amount smaller than a voltage produced by a second electrochemical cell; and
means, disposed within said housing and responsive to said means for detecting, for resettably interrupting the recharging current to said plurality of electrochemical cells.

16. A battery assembly in accordance with claim 15 further comprising means, disposed within said housing, for producing a reference voltage.

17. A battery assembly in accordance with claim 16 further comprising means, disposed within said housing, for determining when said electrochemical cells produce a voltage exceeding a predetermined proportion of said reference voltage.

18. A battery assenbly in accordance with claim 16 wherein said means for producing a reference voltage further comprises a zener diode.

19. A battery assembly in accordance with claim 15 wherein the predetermined chemistry system further comprises a lithium electrode.

* * * * *